United States Patent Office 2,767,056
Patented Oct. 16, 1956

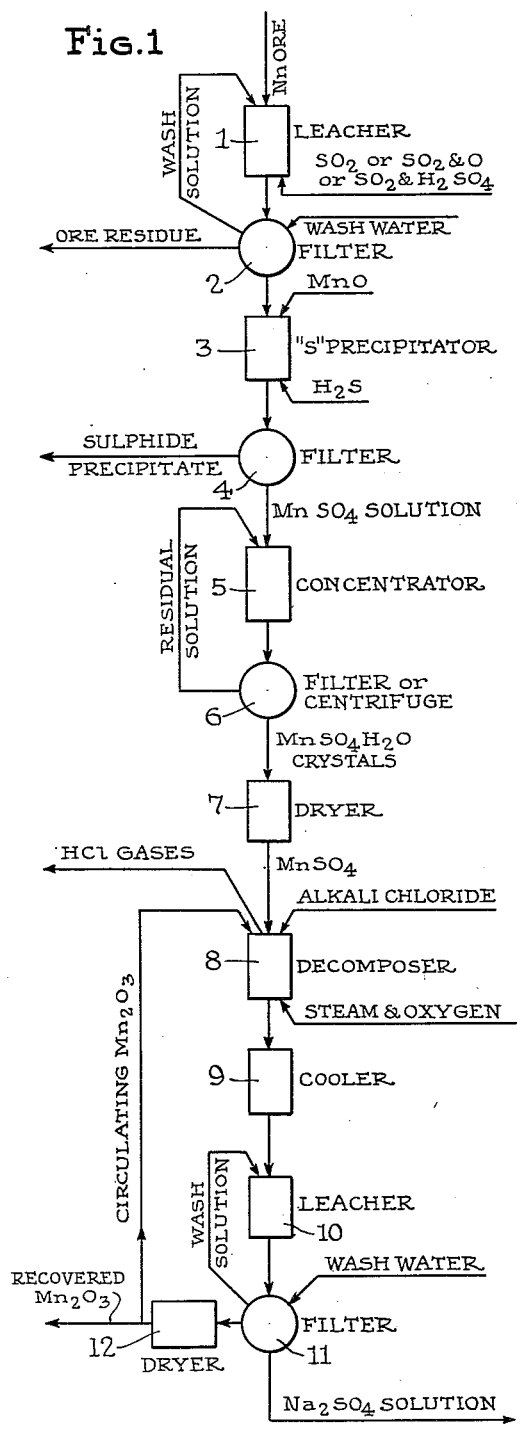
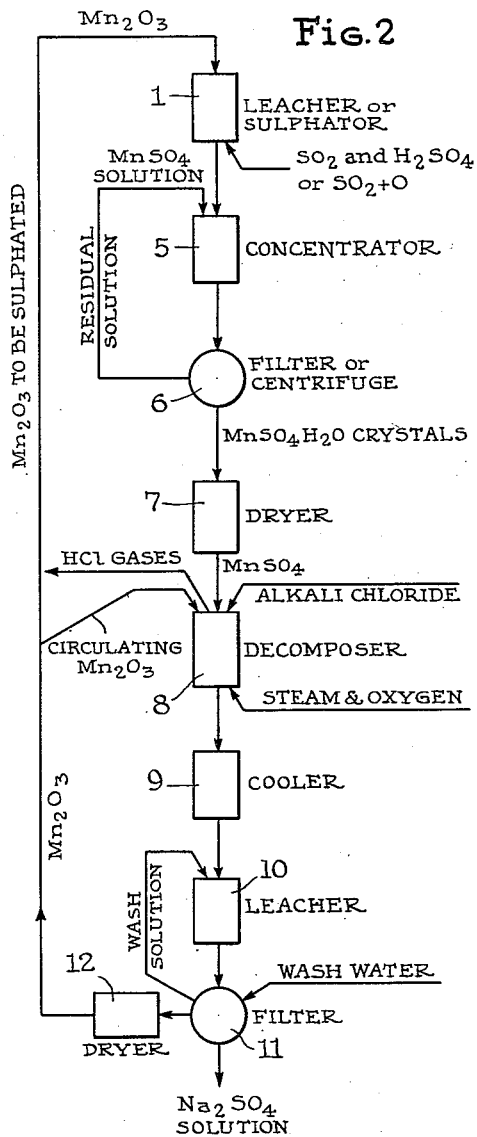

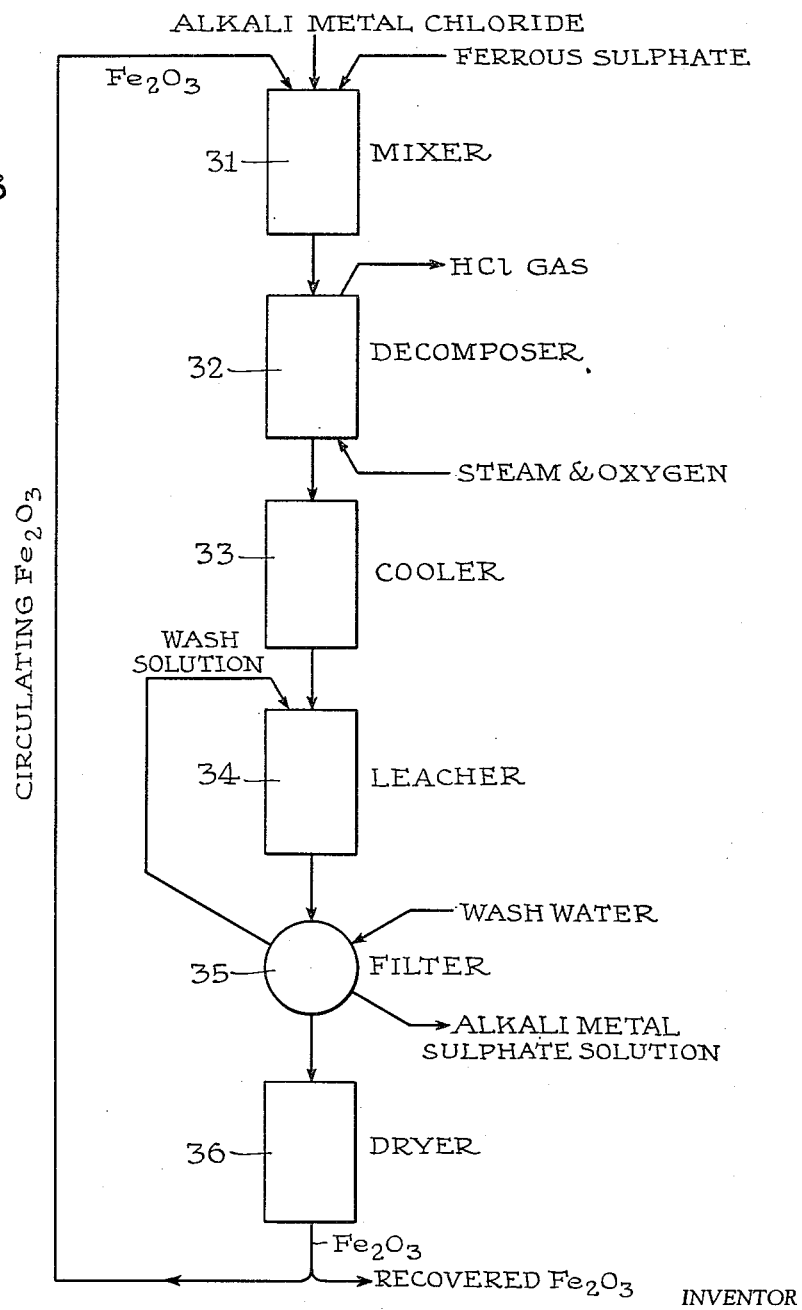

2,767,056

PROCESS FOR MAKING HYDROCHLORIC ACID AND RECOVERING METAL OXIDES

Niels C. Christensen, Bauer, Utah

Application April 13, 1953, Serial No. 348,480

17 Claims. (Cl. 23—154)

This application is a continuation-in-part of my application Serial No. 217,838, filed March 27, 1951, now abandoned.

The invention relates to processes for the making of hydrochloric acid from alkali metal chlorides, particularly potassium and sodium chlorides. The invention further relates to a combined process for the treatment of either manganese or iron sulphate to recover manganese oxide and ferric oxide, respectively, and to the manufacture of hydrochloric acid from alkali metal chlorides, especially sodium and potassium chlorides.

In the particular case of the invention where manganese sulphate is used, the invention comprehends the treatment of manganese ores or products to recover manganese therefrom as a sulphate for use in the treatment of the alkali metal chlorides to make hydrochloric acid therefrom. The essential steps of the process where manganese sulphate is used are such that it may be used either for the manufacture of hydrochloric acid alone, or for the treatment of manganese ores for the recovery of manganese therefrom as an oxide and the manufacture of hydrochloric acid. Since the cost of carrying out the process will be substantially the same in either of these cases, the preferred application of the process will be for the treatment of the ore and the making of the acid, though the process may be economically used where manganese ore suitable for treatment is not available.

Referring more particularly to the embodiment of the invention involving the use of manganese sulphate:

The process consists of two principal steps or parts— first, the treatment of a mixture of finely divided manganese sulphate and alkali metal chloride with steam and oxygen at a suitable temperature high enough to cause the decomposition of the manganese sulphate and alkali chloride and formation of hydrochloric acid, manganese oxide and sodium sulphate, as indicated in the following equation:

$2MnSO_4 + 4NaCl + 2H_2O + O = Mn_2O_3 + 2Na_2SO_4 + 4HCl$ and separating the HCl gas thus formed from the $Mn_2O_3$ and $Na_2SO_4$; and second, the manufacture of manganese sulphate, for use in the first step, by the treatment of manganese oxide ores, or $Mn_2O_3$, with $SO_2$, or $SO_2$ and $H_2SO_4$, or $SO_2$ and oxygen (as required by the ore or manganese product being used), as indicated in the following equations:

$MnO_2 + SO_2 = MnSO_4$
$Mn_2O_3 + SO_2 + H_2SO_4 = 2MnSO_4 + H_2O$
$Mn_2O_3 + SO_2 + 1\frac{1}{2}O_2 = 2MnSO_4$ The accompanying drawings illustrate by means of flow sheets the more detailed description of the processes and the methods of carrying it out, the same as given below. In the drawing:

Figure 1 represents a flow sheet illustrating the combined process for the treatment of manganese ore and the making of hydrochloric acid;

Figure 2 is a flow sheet illustrating the process as used for making hydrochloric acid alone, employing manganese sulphate; and Figure 3 is a flow sheet illustrating the process as used for making hydrochloric acid alone and employing ferrous sulphate.

Referring to Figures 1 and 2, it should be observed that the flow sheets illustrated therein are similar, except that in Figure 2, the filter 2 and precipitator 3 and filter 4 are omitted, as the $MnSO_4$ used in the process shown in Figure 2 is made from $Mn_2O_3$ recovered in the process and used over and over again cyclically, and there is, therefore, no ore residue to be separated from the $MnSO_4$ solution or impurities to be precipitated from the $MnSO_4$ solution. The same numbers indicate the same or similar pieces of apparatus in both flow sheets of Figures 1 and 2.

Referring more particularly to the flow sheets of Figures 1 and 2, the first step in the process consists in treating the ore, or manganese oxide product for the recovery of the manganese in solution as manganese sulphate by leaching the ore, or $Mn_2O_3$ product, with $SO_2$, or $SO_2$ and $O$, or $SO_2$ and $H_2SO_4$. If the manganese in the ore is substantially all in the form of $MnO_2$, the leaching process is carried out with $SO_2$ alone, the manganese being recovered in solution as $MnSO_4$, as indicated in the following chemical equation:

$MnO_2 + SO_2 = MnSO_4$

If the ore contains lower oxides of manganese, such as $Mn_2O_3$, the $MnSO_4$ may be made by treatment of the ore with $H_2SO_4$ and $SO_2$, as indicated below:

$Mn_2O_3 + SO_2 + H_2SO_4 = 2MnSO_4 + H_2O$

If desired, such ore may be treated with $SO_2$ and oxygen in a spray leacher to convert the manganese to $MnSO_4$, as indicated below:

$Mn_2O_3 + 2SO_2 + O = 2MnSO_4$

As shown in flow sheet of Figure 2, in cases where no suitable manganese ore is available, manganese oxide recovered in the process is used over and over again, cyclically, to make the $MnSO_4$ required in the process, by treatment of this $Mn_2O_3$ with $SO_2$ and $H_2SO_4$ (or $SO_2$ and $O$) as indicated in the following chemical equations:

$Mn_2O_3 + SO_2 + H_2SO_4 = 2MnSO_4 + H_2O$
$Mn_2O_3 + 2SO_2 + O = 2MnSO_4$

The leaching operation for the recovery of Mn from the ores as $MnSO_4$ (flow sheet of Figure No. 1), or preparation of $MnSO_4$ from $Mn_2O_3$ (flow sheet of Figure No. 2), or preparation of the $MnSO_4$ in solution is preferably carried out by mixing the finely ground ore (or $Mn_2O_3$) with water (preferably wash solution from the filtering or decanting operation in which the $MnSO_4$ solution is separated from ore residue, in case the process is used for the treatment of ore) to form a slurry and treating the slurry with $SO_2$ gases in a spray leacher 1 of the type shown in U. S. Patent No. 2,454,594, but may be carried out in any apparatus suitable for bringing the mixture of ore and solution into intimate contact with the $SO_2$ gases. If $H_2SO_4$ is required in the leaching step, as described above, this acid is preferably added to the slurry at the beginning of the leaching operation. If oxygen is used in this operation, as mentioned above, the oxygen is admitted as excess air (or pure O) with the $SO_2$ gases.

Following the leaching operation, the $MnSO_4$ solution is separated from the ore residue by filtering and washing on the filter 2 (or by settlement and countercurrent washing if desired). When the process is not used for treatment of ore, the filtering and washing step may be omitted as indicated in Figure 2.

The $MnSO_4$ solution secured by leaching the manganese ore, may contain valuable metals such as zinc, copper, cobalt, nickel, etc. These are precipitated from the solution as sulphides by treatment of the solution with a suitable sulphide such as MnS or with MnO and $H_2S$ in a suitable agitator 3 to secure a pure sulphide precipitate as indicated in the following equations:

$$"M"SO_4 + MnS = "M"S + MnSO_4$$
$$"M"SO_4 + H_2S + MnO = "M"S + MnSO_4 + H_2O$$

("M" indicating any one or more of the metals other than manganese in the solution). If a pure precipitate is not desired, these metals may be precipitated together with $CaSO_4.2H_2O$ by means of $CaCO_3$ and $H_2S$ in a suitable spray agitator 3, preferably of the type described in U. S. Patent No. 2,454,594 (or any other suitable apparatus), or with $Ca(SH)_2$ as indicated in the following equations:

$$"M"SO_4 + H_2S + CaCO_3 = "M"S + CaSO_4 + H_2O$$
$$"M"SO_4 + Ca(SH)_2 = "M"S + CaSO_4 + H_2S$$

(If the process is being used for the manufacture of HCl alone, this cleanup or precipitation step and the succeeding filtering operation are, of course omitted—as indicated in flow sheet of Figure No. 2.) The "M"S precipitate is separated from the $MnSO_4$ solution by filtering and washing on the filter 4.

The pure $MnSO_4$ solution made in these leaching operations is concentrated by heating and evaporation to recover the manganese therefrom as $MnSO_4.H_2O$ in a suitable concentrator 5. This operation is preferably carried out in two steps, a spray evaporation in which the solution is heated by condensation of steam from the succeeding step and the solution evaporated by passage of air through the heated solution in a suitable spray apparatus of the type described in U. S. Patent No. 2,454,593 (or any suitable device), followed by a final evaporation step in which $MnSO_4.H_2O$ is precipitated to form a relatively thick slurry of these crystals in a concentrated residual $MnSO_4$ solution. This operation is preferably conducted in apparatus in which the heat from the hot $Mn_2O_3$ product from the decomposing operation is cooled and its heat used in this final concentrating and crystallizing operation.

The $MnSO_4.H_2O$ crystals from the crystallizing operation are separated from the residual $MnSO_4$ solution in a centrifuge or filter 6 and the concentrated residual $MnSO_4$ solution is returned to the concentrating and crystallizing operation (as indicated on the flow sheets). The $MnSO_4.H_2O$ crystals are of such character that they are easily separated from the hot residual solution requiring relatively very small equipment (either centrifuge or filter). The $MnSO_4.H_2O$ crystals from the centrifuge or filter 6 are dried in a suitable dryer 7. This operation offers no difficulty since the crystals dry readily without melting or fritting.

The dry $MnSO_4$ is finely ground and thoroughly mixed with finely divided dry NaCl (or KCl) and with $Mn_2O_3$ in sufficient quantity to prevent fusing or fritting of the mixture during the decomposing operation. If the mixture of $MnSO_4$ and alkali chloride is treated alone, i. e. without mixture and dilution with inert solid material in the decomposing operation, it will melt or frit at any temperature at which the decomposition is sufficiently rapid to be economically feasible (due to the long time of treatment required for complete decomposition at lower temperatures). The charge to the decomposer 8 is therefore made up in approximately the following proportions:

10 parts $MnSO_4$
8 parts NaCl (or 10.5 parts KCl)
75 parts (or more) $Mn_2O_3$

In these proportions, the sodium chloride is about 5% in excess of that required according to the equations given below, but a slight excess of chloride is necessary to secure complete decomposition of the $MnSO_4$. This mixture is heated, preferably in countercurrent, with steam and oxygen (air or pure oxygen) to a temperature of approximately 700° C., at which temperature the $MnSO_4$ and alkali chloride and steam and oxygen react to form $Mn_2O_3$, $Na_2SO_4$ and HCl, as indicated in the following equation:

$$2MnSO_4 + 4NaCl + 2H_2O + O = Mn_2O_3 + 2Na_2SO_4 + 4HCl$$

As noted above, the preliminary heating operation should preferably be carried out as near 700° C. as possible for the following reasons: If carried out much above this temperature, the $MnSO_4$ may begin to decompose before the above reaction is completed, forming $Mn_2O_3$ and $SO_3$, the latter being removed from the furnace in the HCl and excess steam, thus causing incomplete decomposition of the alkali chloride and loss of $SO_2$ in the process. Below 700° C., the rapidity of the reaction decreases with decrease in temperature, the decrease becoming more pronounced as the temperature decreases, and the required excess of steam and oxygen also increase with decrease in temperature. The decomposing operation may be carried out in any suitable kiln or furnace 8, either by direct or indirect heating and either with air or pure oxygen, depending upon the concentration of HCl desired in the gases from the decomposer. If the most concentrated gas is required, the operation may be carried out in a muffle type furnace using oxygen and steam in contact with the solids in the charge. If a less concentrated HCl gas is satisfactory, air may be used instead of oxygen alone. The decomposition may also be carried out in a rotary kiln by passing the charge through the kiln in countercurrent with the hot steam and oxygen or air. If a very concentrated HCl gas is required, the heating may be done by burning hydrogen and oxygen to form steam and using the hot steam and an excess of oxygen to heat the charge and to decompose the salts as described above and as indicated in the following equations:

$$2H_2 + O_2 = 2H_2O$$

$$2MnSO_4 + 4NaCl + 2H_2O + O = Mn_2O_3 + 2Na_2SO_4 + 4HCl$$

A somewhat less concentrated HCl gas may be secured by the same method by using natural gas and oxygen, the HCl gas in this case being diluted with $CO_2$ as indicated in the following equations:

$$CH_4 + 2O_2 = 2H_2 + CO_2$$

$$2MnSO_4 + 4NaCl + 2H_2O + O = Mn_2O_3 + 2Na_2SO_4 + 4HCl$$

If only a very dilute HCl gas is required, the heating in the kiln may be done by means of oil or coal dust and air, the required amount of steam being supplied from a boiler or other source. To secure rapid and complete decomposition of the alkali chloride and $MnSO_4$ as indicated in the foregoing equations, it is necessary to use an excess of steam and oxygen but, by conducting the operation so that the gases and solids move countercurrently during the heating and decomposing operation, the excess steam and oxygen or air may be kept at a minimum.

The hot mixture of $Na_2SO_4$ and $Mn_2O_3$ (consisting of the $Mn_2O_3$ formed from the $MnSO_4$ together with the circulating $Mn_2O_3$) from the decomposer 8 is cooled in a cooler 9 (preferably, as noted above, in such a manner as to utilize the heat in this mixture in the concentrating and crystallizing operation) and the mixture is leached with water in the leaching agitator 10 to dissolve the $Na_2SO_4$ and form a $Na_2SO_4$ solution which is separated from the $Mn_2O_3$ by filtering and washing on the filter or centrifuge 11.

The wet filter cake of $Mn_2O_3$ is dried in a suitable dryer 12 and the dried circulating $Mn_2O_3$ is mixed with the MnSO4 and NaCl (or KCl) and sent to the decomposer 8 for re-use in the process as described, the amount of Mn2O3 recovered from ore, as indicated in flow sheet of Figure No. 1, being separated from the circulating Mn2O3 before the latter is returned to the mixing and decomposing operation. In case no ore is treated, as in flow sheet of Figure No. 2, sufficient of the Mn2O3 is converted to MnSO4 in each cycle as described above for use in the decomposition of the alkali metal chloride, as described above and as indicated in flow sheet of Figure No. 2.

As will be seen from the foregoing, the invention makes possible the manufacture of hydrochloric acid from alkali metal chlorides by a simple and efficient process in which a pure acid is made and high grade sodium sulphate is recovered. Used for this purpose alone, the process is both efficient and economical and requires a much less elaborate and expensive plant than past methods for making hydrochloric acid from SO2 and NaCl (or KCl). When used for the combined treatment of manganese ores and the manufacture of hydrochloric acid and alkali sulphate, as described above, the invention offers a process so much more efficient and economical (than when used for the manufacture of HCl alone) that all the advantages are greatly increased since, for substantially the same cost, it is possible to both treat the ore for the recovery of the manganese and make an equivalent amount of HCl and Na2SO4.

As stated above, a quantity of Mn2O3 is added and thoroughly mixed with the finely divided MnSO4 and dry NaCl (or KCl), introduced into the decomposer, for the purpose of preventing fusing or fritting of the mixture during the decomposing operation. In lieu of Mn2O3, there can be used for this purpose any other suitable inert material, such as quartz, sand, etc., which does not take part chemically in the decomposing process. If a mixture of MnSO4 and NaCl alone were treated in the decomposer, they would form a molten mass in the decomposing furnace at any decomposition temperature sufficiently high to render the process economically practicable. Due to the formation of a molten mass, the decomposition reaction becomes so slow as to be impractical, since the amount of surface exposed to the steam and oxygen is so small and is quickly covered with a thin layer of Mn2O3 which prevents further action. For this reason, a relatively finely divided solid inert diluent is necessary to distribute the mixture of alkali metal chloride and MnSO4 over a large surface for contact with the steam and oxygen. Any inert diluent, such as silica, sand or Mn2O3 may be used, but the Mn2O3 is preferred since, when it is used, there is no need of separating the Mn2O3 produced in the process from the diluent.

As has been stated above, the action in the decomposer may be represented by the following equation:

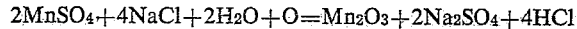

2MnSO4+4NaCl+2H2O+O=Mn2O3+2Na2SO4+4HCl

An excess of steam and oxygen of 25% or more than indicated in the above equation is required for complete decomposition as indicated in the equation. By carrying out the decomposing process in countercurrent, i. e. passing the steam and oxygen and the mixed solids through the heating furnace in opposite directions, a complete reaction as indicated may be secured, and the highest possible concentration of HCl in the exit gases is also obtained.

It should also be observed that if the MnSO4 and NaCl are very finely ground and thoroughly mixed before being heated and treated with the steam and oxygen, the temperature used in the decomposing process may be as high as 850° C. without appreciable loss of SO3. A temperature of 700° C., however, is high enough to secure a rapid reaction with a relatively small excess of steam and oxygen; a temperature of 700° C. or slightly higher is, therefore, preferred.

As disclosed earlier in the specification, the present invention also comprehends a process for making hydrochloric acid from alkali metal chlorides, particularly, sodium and potassium chlorides, and for the recovery of the iron from ferrous sulphate as ferric oxide, the alkali metal being recovered in the process as a sulphate. This embodiment of the invention is more particularly illustrated in the flow sheet of Figure 3. This variant of the invention may be utilized for the manufacture of hydrochloric acid, using ferrous sulphate from any source, but is particularly useful in connection with the treatment of ferrous sulphate recovered from ilmenite in the manufacture of titanium oxide, and from other processes in which ferrous sulphate is recovered as a byproduct or as a waste product.

In general, this modification of the process of the invention consists of the treatment of a mixture of finely divided metal chloride and finely divided ferrous sulphate with steam and oxygen at a high enough temperature to cause the decomposition of the alkali metal chloride and the ferrous sulphate with the formation of hydrochloric acid, ferric oxide and alkali metal sulphate, as indicated in the following equation:

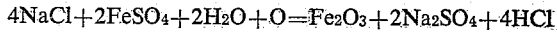

4NaCl+2FeSO4+2H2O+O=Fe2O3+2Na2SO4+4HCl

Figure 3 shows a flow sheet of the process employing ferrous sulphate and illustrates the essential steps thereof. As shown in Figure 3, the finely divided FeSO4 and the finely divided alkali metal chloride are mixed in the mixer 31 with sufficient circulating Fe2O3 to prevent fusing in the heating operation. An intimate mixture of the alkali metal chloride and ferrous sulphate is necessary to secure complete decomposition, and a uniform mixture of the alkali metal chloride and the ferrous sulphate with the circulating ferric oxide is necessary for most efficient operation of the decomposition process. Sufficient circulating ferric oxide must be used to prevent fusion of the mixture in the decomposing step; should the mixture of chloride and ferric oxide form a fluid or sticky mass during the heating operation, then, the decomposition is so slow as to be economically impractical. If a mixture of alkali chloride and ferrous sulphate alone be treated with the steam and oxygen (oxygen alone or air) at a high enough temperature to cause decomposition, the mixture fuses and the decomposition is so retarded that it becomes impractical; also, the decomposition cannot be carried out by reason of the adherence or sticking of the mass to the walls of the decomposer. For this reason, and as disclosed earlier in this specification, sufficient finely divided ferric oxide, or other suitable inert solid finely divided diluent, must be used to prevent the fusing or fritting together or agglomeration of the mixture—i. e. a large enough surface of ferric oxide or other inert diluent particles must be provided to distribute the mixture of alkali metal chloride and ferrous sulphate and thereby expose a very large surface of the mixture of alkali chloride and ferrous sulphate to the action of the steam and oxygen.

To insure this intimate mixture of the charge, the alkali chloride and ferrous sulphate may be mixed first and, thereafter, this mixture is mixed with the circulating ferric oxide. In order to secure a complete decomposition of the ferrous sulphate, a small excess of the alkali metal chloride may be used if it be desired to insure that no undecomposed iron salts remain in the treated product to contaminate the alkali metal sulphate produced in the process. A mixture in approximately the following proportions has been found very satisfactory in the decomposing step:

10 parts ferrous sulphate
8 parts sodium chloride, and
75 parts ferric oxide

With KCl, a slightly larger proportion of ferric oxide gives the best results.

The mixture of alkali metal chloride, ferrous sulphate and ferric oxide, in approximately the proportions indicated above, is treated with steam and oxygen in the decomposer 32 at a temperature high enough to secure rapid and complete decomposition. An excess of both steam and oxygen is required for complete decomposition. At 500° C., the reaction is rapid and complete in approximately 15 minutes. To reduce the required excess of steam and oxygen to a minimum and secure efficient separation of the gaseous hydrochloric acid, the operation is carried out in counter-current, the solids being passed through the decomposer in one direction and the gases in the opposite direction. The rapidity of the decomposition increases with increase in temperature but, in the neighborhood of 550°–600° C., gives a sufficiently rapid decomposition for all practical purposes. Potassium chloride gives better results at a slightly higher temperature than that required for sodium chloride.

In the decomposition step, steam and either pure oxygen, air enriched with oxygen, or ordinary air, may be used—depending upon the concentration of HCl required or desired in the gases resulting from the decomposition reaction. In the annexed claims, the term "oxygen" is used to denote any gas containing free oxygen, such as oxygen alone, air enriched with oxygen or ordinary air. The decomposition is somewhat more rapid with gases having higher concentrations of oxygen, and the size of apparatus required is, of course, diminished with increase in the concentration of oxygen due to the smaller volume of gases required.

The decomposition may be carried out in a rotary kiln or any other type of apparatus in which the required temperature may be maintained and an efficient contact between the gases and solids may be secured.

The hot mixture of ferric oxide and alkali metal sulphate from the decomposer 32 is cooled in any suitable cooler 33 and is then leached with a water solution in the leacher 34, the alkali sulphate being thus brought into solution and is, thereupon, separated from the ferric oxide by filtration and washing on the filter 35; the wash solution from this operation is used for the dissolving operation, as indicated in the flow sheet of Figure 3.

The washed filter cake of ferric oxide is dried in any suitable form of drier 36, and an amount of ferric oxide corresponding to that produced from the ferrous sulphate is separated from the dried product and removed from the system; the remainder of the ferric oxide is used over again in admixture with more alkali metal chloride and ferrous sulphate in the decomposition process, as above described.

The recovery of $FeSO_4$—for use in the process described above—from a sulphuric acid solution, though somewhat more difficult than its recovery from a water solution, presents no serious difficulties if carried out as follows:

The acid solution is heated and evaporated until there is formed a slurry of crystals of $FeSO_4.H_2O$ in a solution of approximately 60% $H_2SO_4$. This acid solution carries little more than a trace of iron, as $FeSO_4$. The crystals of $FeSO_4.H_2O$ are separated from the concentrated $H_2SO_4$ solution by filtration or by means of a centrifuge. The filter cake is heated to drive off the residual $H_2SO_4$ and water and the dried $FeSO_4$ product is pulverized to prepare it for the decomposition process described above. The concentrated $H_2SO_4$ solution, as noted above, contains a very small amount of iron and may generally be utilized in the process from which it was recovered with the $FeSO_4$ in solution.

In the process illustrated in the flow sheet of Figure 3, the excess of steam and oxygen required diminishes with increase in temperature; however, this effect is not sufficient to compensate for the difficulties encountered when working at temperatures higher than those indicated.

By the process above described, a relatively very pure HCl may be made from alkali metal chlorides and a high grade $Fe_2O_3$ product may be recovered from the $FeSO_4$, further, the alkali metals and $SO_4$ may be recovered as a relatively pure alkali metal sulphate.

Having described my invention, what I claim and desire to patent is:

1. The process of making hydrochloric acid which consists in heating a mixture comprising a sulphate from the group consisting of ferrous sulphate and manganous sulphate and an alkali metal chloride in the proportion of substantially two molecules of alkali chloride to one molecule of metal sulphate, and an oxide of the metal of the sulphate used, said oxide being selected from the group consisting of ferric oxide and manganic oxide in the amount of more than four times the combined weight of the said sulphate and chloride, said heating being to a temperature between 500° and 600° C. in the case of the ferrous sulphate, and said heating being to a temperature between 700° and 850° C. in the case of manganous sulphate, and said heating being effected in contact with a current of gas containing a mixture of steam and oxygen in the proportion of substantially one molecule of elemental oxygen to four molecules of steam, and thereby decomposing the alkali chloride and the metal sulphate and forming hydrochloric acid gas and alkali metal sulphate and metal oxide, and removing the hydrochloric acid gas from the mixture of alkali metal sulphate and metal oxide.

2. A process according to claim 1, wherein the contact between said solids and gases is carried out with counter-current flow of said solids and gases.

3. A process according to claim 1, wherein the metallic sulphate is ferrous sulphate and the oxide is ferric oxide.

4. A process according to claim 3, wherein the contact between said solids and said gases is carried out with countercurrent flow of said solids and gases at a temperature within the range of 550°–600° C.

5. A process according to claim 3, wherein said alkali metal sulphate is separated from said ferric oxide by leaching with water, filtering and washing of the ferric oxide.

6. A process according to claim 3, wherein the alkali metal sulphate is separated from the ferric oxide by leaching with water, filtering and washing of the ferric oxide, and wherein a portion of the washed ferric oxide, substantially equal in amount to that formed from the ferrous sulphate, is removed from the system, while the remainder of the washed ferric oxide is added to a further mixture of alkali metal chloride and ferrous sulphate to be decomposed.

7. A process according to claim 3, wherein the alkali metal sulphate is separated from the ferric oxide by leaching with water, filtering and washing of the ferric oxide, and wherein the washed ferric oxide is dried and a portion of the dried ferric oxide, substantially equal in amount to that formed from the ferrous sulphate, is removed from the system, while the remainder of the dried ferric oxide is added to a further mixture of alkali metal chloride and ferrous sulphate to be decomposed.

8. The process of claim 1, wherein the metallic sulphate is manganous sulphate and the oxide is manganic oxide.

9. A process according to claim 8, wherein a portion of the manganic oxide is separated from the alkali metal sulphate, is converted into manganous sulphate by treating it in the condition of an aqueous pulp with $SO_2$ and $H_2SO_4$, and the resultant manganous sulphate is used in the decomposition of more alkali metal chloride as described.

10. A process according to claim 8, wherein a portion of the manganic oxide is separated from the alkali metal sulphate, is converted into manganous sulphate by treating it with $SO_2$ and oxygen, and the resultant manganous sulphate is used in the decomposition of more alkali metal chloride as described.

11. A process according to claim 8, characterized in that a portion of the manganic oxide is separated from the alkali metal sulphate, and is converted to manganous sulphate, and the latter is used in the decomposition of more alkali metal chloride as described.

12. A process according to claim 8, wherein the treatment is carried out at a temperature of about 700° C.

13. A process according to claim 8, wherein the contact between said solids and gases is carried out with countercurrent flow of said solids and gases.

14. A process according to claim 8, wherein the contact between said solids and gases is carried out with countercurrent flow of said solids and gases, and said heating takes place at a temperature of approximately 700° C.

15. The combined process of treating oxide ores of manganese and making hydrochloric acid, which comprises the steps of: leaching said ores with sulfur containing reagents which convert the contained manganese into manganous sulphate in solution; separating the manganous sulphate solution from the ore residue; heating and concentrating said solution so as to recover the manganous sulphate therefrom as a solid; drying and grinding said solid product and mixing the resultant finely divided manganous sulphate with finely divided alkali metal chloride, and manganic oxide in the amount of more than four times the combined weight of the said sulphate and chloride; heating said mixture to a temperature between 700° and 850° C. in contact with a current of hot steam and oxygen and thereby decomposing said alkali metal chloride and manganous sulphate and forming hydrochloric acid gas, alkali metal sulphate and manganic oxide; separating the hot hydrochloric acid gas from the hot mixture of manganic oxide and alkali metal sulphate; cooling said last mixture and leaching it with water to recover the manganic oxide and alkali metal sulphate as separate products.

16. A process according to claim 15, wherein the manganic oxide recovered from the leached mixture is segregated into two parts and one part is added to the mixture to be decomposed.

17. A process according to claim 15, wherein the leaching of the manganese ores is carried out with $SO_2$ and oxygen.

References Cited in the file of this patent
UNITED STATES PATENTS 2,002,859    Levy ------------------ May 28, 1935

FOREIGN PATENTS

359    Great Britain ----------- Feb. 5, 1872

OTHER REFERENCES

"A Comprehensive Treatise on Inorganic and Theoretical Chemistry," vol. 12, page 416, 1932 ed. and vol. 14, 1935 ed., pages 264, 278, author, J. W. Mellor; Longmans, Green and Co., N. Y.